Jan. 18, 1955  A. J. KOBLER  2,699,690
SPEED REDUCTION GEARING
Filed March 6, 1951
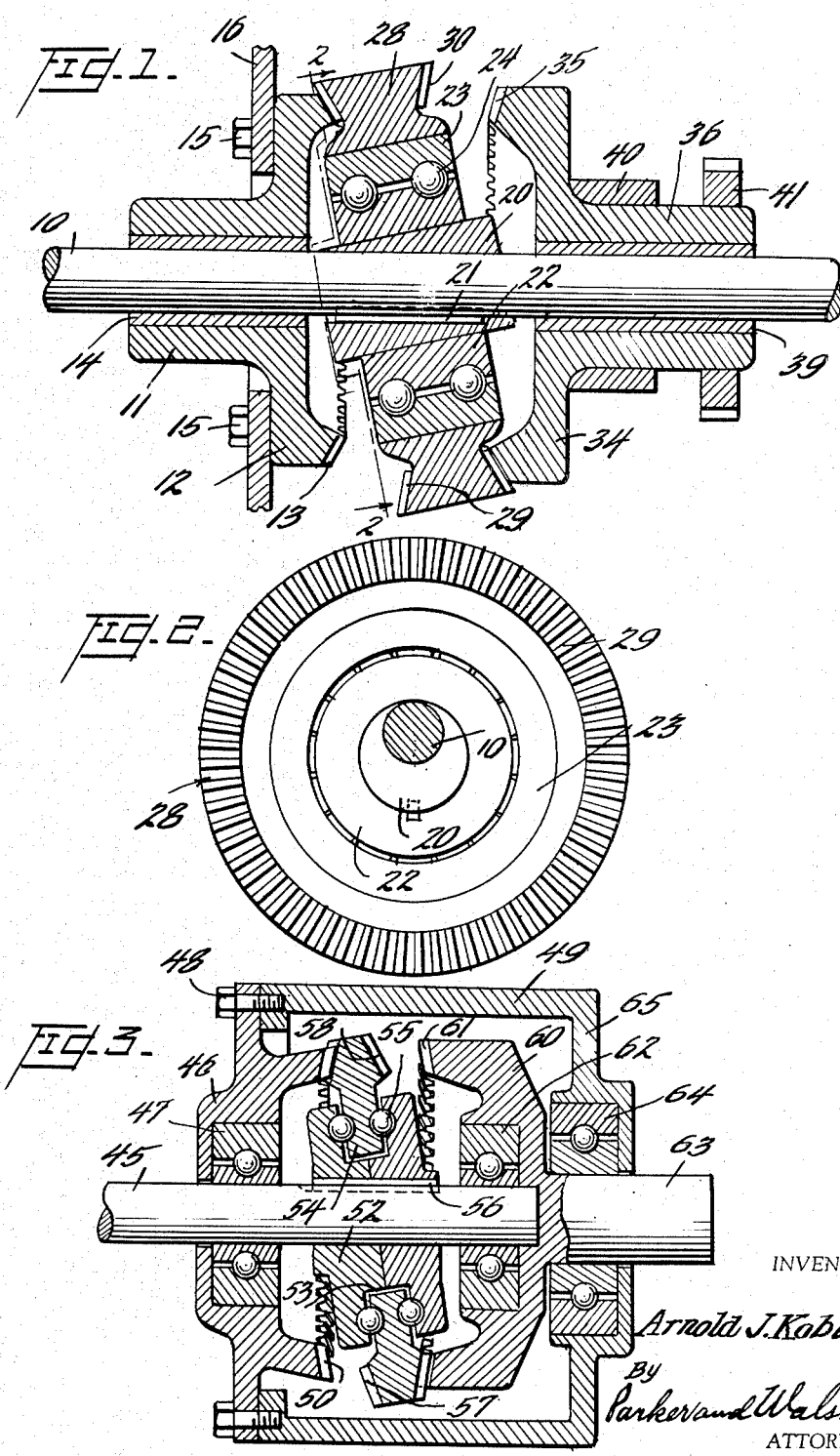
INVENTOR
Arnold J. Kobler,
By
Parker and Walsh
ATTORNEYS

United States Patent Office 2,699,690
Patented Jan. 18, 1955

2,699,690

SPEED REDUCTION GEARING

Arnold J. Kobler, Fairbanks, Territory of Alaska

Application March 6, 1951, Serial No. 214,089

7 Claims. (Cl. 74—800)

This invention relates to speed reduction gearing.

An important object of the present invention is to provide a highly simplified type of reduction gearing employing a minimum number of parts in which a high ratio reduction may be obtained.

A further object is to provide such a gearing wherein the power input and power take-off are axially aligned without the use of a jack shaft, thus permitting the gearing to be maintained at a minimum size and to increase its simplicity and efficiency in operation.

A further object is to provide such a gearing wherein the power input and power take-off readily may be at the same or opposite ends of the construction, thus expanding the possibility of its uses without introducing complications which might be necessary in the absence of such flexibility in use, such as the use of additional power transmission elements.

A further object is to provide such a gearing wherein a minimum number of gears are employed and wherein standard gear teeth are used without the employment of any relatively small gears.

A further object is to provide such an apparatus wherein the power take-off may be at a substantially reduced speed and wherein the power take-off element, according to the selection of parts, may rotate forward or reverse relative to the direction of rotation of the input element.

Other objects and advantages of the present invention will become apparent during the course of the following description.

In the drawing, I have shown two embodiments of the invention. In this showing,

Figure 1 is an axial sectional view through one type of gearing and associated elements, parts being shown in elevation, Figure 2 is a sectional view on line 2—2 of Figure 1, and Figure 3 is a sectional view similar to Figure 1 showing a modified type of gearing.

Referring to the drawing, the numeral 10 designates a shaft either end of which, in the embodiment of the invention shown in Figures 1 and 2, may be connected to a source of power, as will become apparent below. This shaft extends through the hub 11 of a gear 12 provided with gear teeth 13, and suitable bearing means may be arranged in the hub 11 and shown in the present instance as a bushing 14. The gear 12 is stationary and accordingly has been shown fixed by screws 15 to a stationary plate 16 which may be part of the housing for the gearing or any other stationary element.

To the right of the gear 12, as viewed in Figure 1, a hub 20 surrounds the shaft 10 and is keyed thereto as at 21. This hub has its axis inclined relative to the axis of the shaft 10 and mounted eccentric thereto, usually to a slight extent, for a purpose to be described. The member 20 has a feather edge on the left side of Figure 1, and a blunt edge on the right side of the figure. This provides the eccentricity previously described. The hub 20 has fixed thereto an inner ball race 22 arranged within an outer race 23, and balls 24 are arranged between the two races as shown in Figure 1. The ball bearing means employed may be conventional and forms no part per se of the present invention.

An annular gear 28 surrounds and is fixed to the outer race 23 and has gear teeth 29 and 30 formed on the respective sides thereof. The gear formed by the teeth 29 meshes with the gear teeth 13, while the gear teeth 30 mesh with another gear to be described. It will be noted that the plane of the gear 28 is perpendicular to the axis of the hub 20.

To the right of the gear 28, as viewed in Figure 1, is arranged a gear member corresponding generally to the gear 12 and indicated by the numeral 34. This gear has teeth 35 meshing with the teeth 30 at a point diametrically opposite the meshing point of the gear teeth 29 with the teeth 13. The gear member 34 is carried by a hub 36 shown in the present instance as having a bushing 39 surrounding the shaft 10 in bearing relationship therewith. The hub 36 may be rotatably mounted in a bearing 40. Power is taken off from the hub 36 in any desired manner, for example by a fixed coupling, universal joint, pulley, or any other conventional means, and the hub 36 is shown in Figure 1 as being provided with a power take-off gear 41.

A slightly modified form of the invention is shown in Figure 3. A power input shaft 45 extends through a stationary gear 46 corresponding to the gear 12, and this gear carries, in the present instance, ball bearing means 47 rotatably supporting the shaft 45. The gear 46 is secured as at 48 to a housing structure 49. The gear 46 has gear teeth 50 similar in function to the teeth 13 described above.

A split hub 52 surrounds the shaft 45 and is inclined from a plane perpendicular to the axis of the shaft 45. The hub 52 is provided with an annular groove 53 receiving a gear member 54, and ball bearings 55 are interposed between the gear member 54 and the elements of the hub 52. This hub is keyed as at 56 to the shaft 45 and like the hub 20, is eccentrically mounted thereon, as clearly shown in Figure 3. The gear member 54 has formed on opposite faces thereof sets of gear teeth designated respectively by the numerals 57 and 58, and the teeth 57 mesh with the teeth 50.

A gear 60, corresponding generally to the driven gear 34, has teeth 61 meshing with the teeth 58 at a point diametrically opposite the point of meshing of the teeth 57 with the teeth 50. The gear member 60 carries a pilot bearing 62 receiving the inner end of the shaft 45. The gear member 60 carries a stub shaft 63 mounted in a conventional ball bearing 64 carried by the adjacent end wall 65 of the housing 49. The projecting end of the stub shaft 63 is provided with suitable power take-off means (not shown) which obviously may be of any desired type such as a coupling, gear, etc., depending upon the particular installation and use it is desired to take off the power, as will be apparent.

Operation

Power is delivered to the shaft 10 from any suitable source, and either end of the shaft 10 may be connected to such source. If it is desired to provide a straight-through drive, power will be delivered to the left hand end of the shaft 10 as viewed in Figure 1. In such case, the right hand end of the shaft may be terminated flush with the outer end of the hub 36, and this hub may be connected to the driven mechanism by any suitable drive means such as a conventional coupling, universal joint or the like. If a right angular driving connection is desired, obviously a bevel gear may be mounted on the hub 36 in place of the spur gear 41. The device, therefore, is quite flexible in its delivery of power to the mechanism to be driven. If for any reason, as may be dictated by particular conditions, it is desired to deliver the power and take it off at the same end of the apparatus, the right hand end of the shaft, as viewed in Figure 1, may be driven, and power may be taken off by a pulley mounted of the hub 36 or any other conventional means forming per se no part of the present invention. The spur gear 41 has been illustrated in Figure 1 purely to suggest the mounting of one type of power take-off means.

As previously stated, the gear 12 is stationary and the shaft 10 drives the hub 20 and the inner race 22 positively and effects movement of the gear 28. The gear teeth 29 roll around the gear teeth 13. The balls 24 form a bearing connection between the races 22 and 23 to permit the race 20 to rotate positively with the shaft 10 while the gear 28 remains fixed against rotation about the axis of the shaft 10 as predetermined by the engagement of the teeth 29 with the teeth 13.

As previously stated, the hub 20 is eccentric to the axis of the shaft 10, and this permit the use of a gear 34 slightly larger than the gear 12, as shown in Figure 1. Therefore, the gear 35 may contain more teeth than the gear 13 without sacrificing anything as to the size and strength of such teeth. Accordingly, standard gear teeth 35 may be employed, meshing with similarly formed teeth 30, and when the wobble gear 28 has completed one cycle of rolling operation around the gear 12, the gear 30 will have imparted to the gear 34 a slight rotational movement dependent upon the relationship of the number of teeth on the gears 13 and 35. The teeth 29 and 30 are equal in number, and upon one complete oscillation thereof, the gear 28 will be back at the exact position from which it started with respect to the engagement of the teeth 13 and 29. Assuming that the gear 34 has one more tooth than the gear 30 and assuming that the latter gear contains sixty teeth, then after the gear member 28 has made one complete oscillation as stated, each tooth 30 will have meshed with one tooth 35 and since the latter teeth exceed the teeth 30 by one tooth, then the gear body 34 will have turned one-sixtieth of a revolution. Under such conditions, a sixty-to-one gear ratio will be provided. This, of course, can be varied by the relation of the number of teeth 30 and 35. If the former has sixty teeth while sixty-two teeth 35 are employed, a thirty-to-one gear ratio will be provided. Thus in a simple straight line drive without jack shafts or the like, a high ratio may be provided between the driving and driven elements, which is highly desirable in the driving of many mechanisms.

While the device in Figure 1 has been described in the sense that it is provided with a single power input element and a single power take-off element, it will be apparent that greater flexibility in use is afforded by the device. The shaft 10 may be driven from the left hand end as shown in Figure 1, for example, and this shaft may extend from the opposite side of the apparatus as shown to provide a direct drive for any mechanism to be driven at shaft speed, while power at a very much reduced gear ratio may be taken off from the gear 41 or other power take-off element. Thus the apparatus, as shown, provides two drive means. It also will be apparent that any number of the devices may be mounted along the shaft 10 to provide power take-offs at different ratios. It also will be apparent that, depending upon the relation between the teeth 30 and 35, very much reduced speeds may be provided in forward or reverse.

The form of the device shown in Figure 3 is the same in operating principles as the device in Figure 1. The inclination of the gear or teeth is opposite to the inclination of the teeth in Figure 1, but this is largely a matter of choice. The device in Figure 3 provides a convenient means for embodying a gear housing where such an element is desired. In either form of the invention, the take-off gears 34 and 60 may be easily replaced by gears with different numbers of teeth to change the gear ratio of the delivered power.

I claim:

1. A speed reduction gearing comprising an input shaft, a stationary gear surrounding said shaft coaxial therewith, a rotatable gear coaxial with said shaft and having gear teeth spaced from and facing generally toward the gear teeth of said stationary gear, and a wobble gear between said stationary and rotatable gears eccentrically mounted with respect to the axis of said shaft and having opposite sets of gear teeth meshing respectively with the teeth of said stationary and rotatable gears, the number of teeth on said rotatable and stationary gears and the size of said gears being different.

2. A speed reduction gearing comprising an input shaft, a stationary gear surrounding said shaft coaxial therewith, a rotatable gear coaxial with said shaft and having gear teeth spaced from and facing generally toward the gear teeth of said stationary gear, a hub mounted on and fixed to said shaft and eccentric thereto, a wobble gear surrounding said hub, bearing means supporting said wobble gear relative to said hub, said wobble gear being supported by said hub and said bearing means in a plane at an angle to a plane perpendicular to said shaft, said wobble gear having opposite sets of gear teeth meshing respectively with the gear teeth of said stationary and rotatable gears, said rotatable gear being larger than said stationary gear and having a greater number of teeth than said stationary gear.

3. A speed reduction gearing comprising a stationary gear and a rotatable gear arranged coaxial with each other, a wobble gear arranged between said stationary and rotatable gears and having opposite sets of teeth meshing respectively with the teeth of said stationary and rotatable gears, said wobble gear being mounted slightly eccentric to the axis of said stationary and rotatable gears, said rotatable gear being larger and having a greater number of teeth than said stationary gear, and means for oscillating said wobble gear.

4. A speed reduction gearing comprising a stationary gear and a rotatable gear arranged coaxial with each other, a wobble gear arranged between said stationary and rotatable gears and having opposite sets of teeth meshing respectively with the teeth of said stationary and rotatable gears, said wobble gear being mounted slightly eccentric to the axis of said stationary and rotatable gears, said rotatable gear being larger and having a greater number of teeth than said stationary gear, a shaft coaxial with and rotatably mounted in said stationary gear, and means mechanically connecting said shaft to said wobble gear to oscillate the latter.

5. A speed reduction gearing comprising a pair of axially aligned spaced gears one of which is stationary and the other of which is rotatable, a shaft extending entirely through said gears, a wobble gear arranged between the gears of said pair and having opposite sets of teeth meshing respectively with the teeth of the gears of said pair, said wobble gear surrounding said shaft and having mechanical connection therewith to be oscillated thereby, and being eccentrically mounted relative to said shaft, said rotatable gear being larger and having more teeth than said stationary gear.

6. A speed reduction gearing comprising a pair of gears in axial alignment, one of which is stationary and the other of which is rotatable, a bearing in said stationary gear, a shaft mounted in said bearing coaxial with said gears and projecting therebetween, a pilot bearing in said rotatable gear and into which an end of said shaft extends, said rotatable gear having an axially projecting power take-off portion, a bearing surrounding such portion of said rotatable gear, a wobble gear eccentrically mounted between the gears of said pair and having oppositely facing sets of teeth respectively engaging the teeth of said stationary and rotatable gears, said wobble gear being arranged in a plane at an angle to a plane perpendicular to said shaft, and means connected between said shaft and said wobble gear for oscillating the latter.

7. A speed reduction gearing comprising a pair of gears in axial alignment, one of which is stationary and the other of which is rotatable, a bearing in said stationary gear, a shaft mounted in said bearing coaxial with said gears and projecting therebetween, a pilot bearing in said rotatable gear and into which an end of said shaft extends, said rotatable gear having an axially projecting power take-off portion, a bearing surrounding such portion of said rotatable gear, a wobble gear between the gears of said pair and having oppositely facing sets of teeth respectively engaging the teeth of said stationary and rotatable gears, said wobble gear being arranged in a plane at an angle to a plane perpendicular to said shaft, a hub fixed to said shaft between the gears of said pair and having its axis parallel to but spaced slightly from the axis of said wobble gear, and bearing means between said hub and said wobble gear, said hub and said bearing means supporting said wobble gear eccentric to said axis, said rotatable gear being larger and having more teeth than said stationary gear.

References Cited in the file of this patent

UNITED STATES PATENTS

| Number | Name | Date |
|---|---|---|
| 515,696 | Sears | Feb. 27, 1894 |
| 544,796 | Shaw | Aug. 20, 1895 |
| 692,696 | McCormack | Feb. 4, 1902 |
| 1,144,807 | Bronner et al. | June 29, 1915 |
| 1,152,004 | Canton | Aug. 31, 1915 |
| 1,611,981 | Amberg | Dec. 28, 1926 |
| 1,896,462 | Nietsche | Feb. 7, 1933 |
| 2,144,110 | Herrick | Jan. 17, 1939 |

FOREIGN PATENTS

| Number | Country | Date |
|---|---|---|
| 452,144 | Italy | Oct. 10, 1949 |
| 971,844 | France | Aug. 16, 1950 |